Patented May 20, 1924.

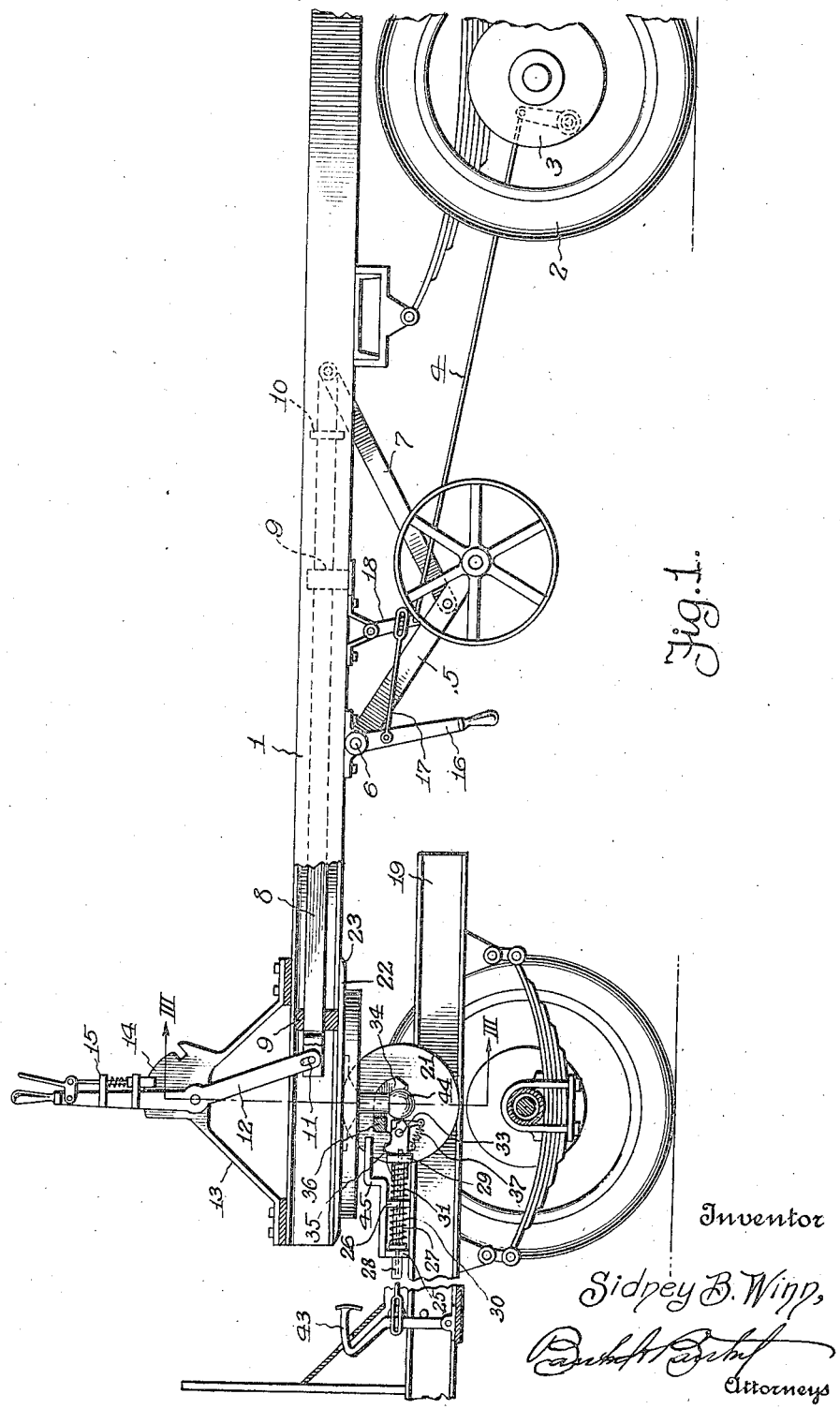

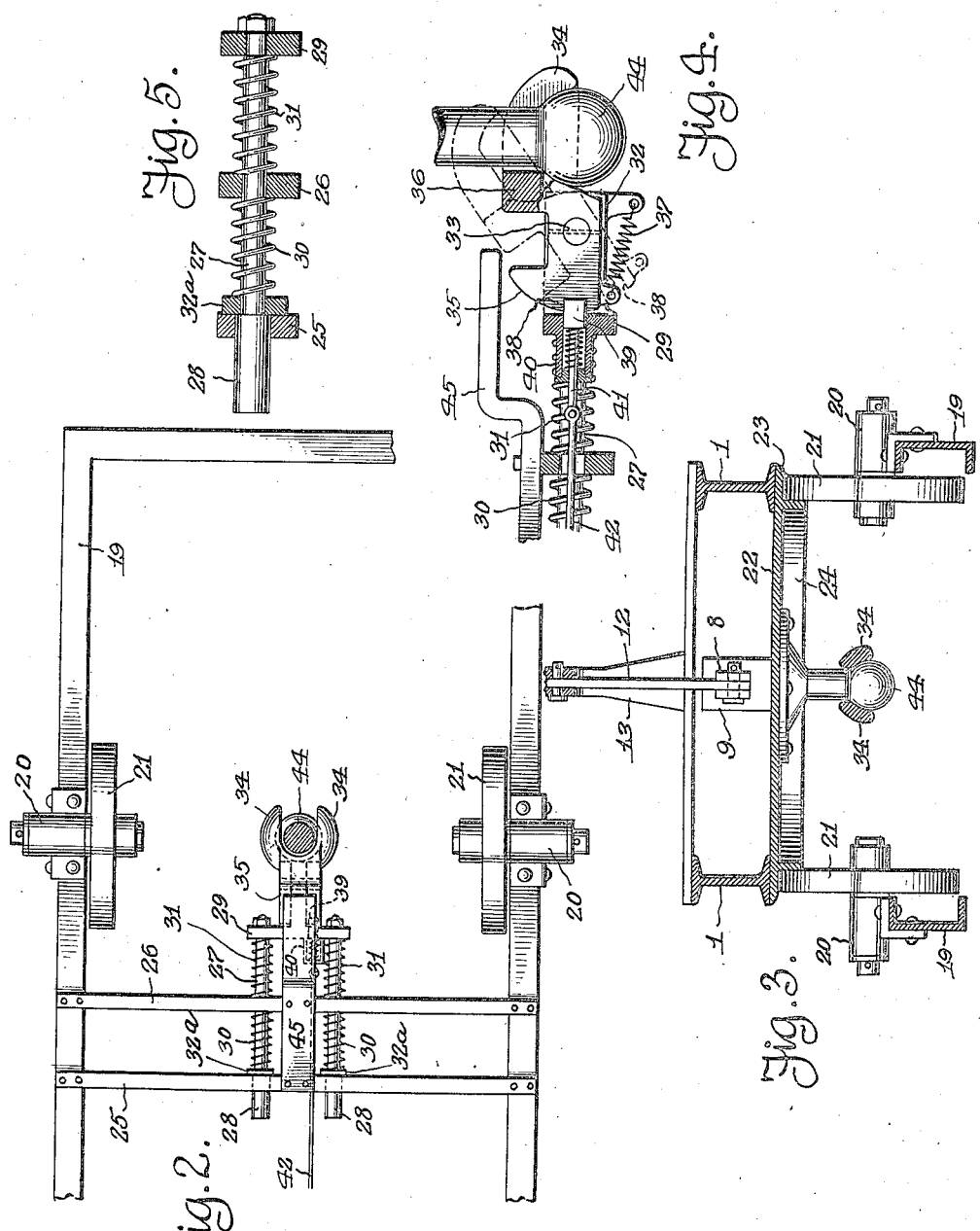

1,494,520

UNITED STATES PATENT OFFICE.

SIDNEY B. WINN, OF LAPEER, MICHIGAN.

TRACTOR TRAILER.

Application filed May 28, 1920. Serial No. 384,946.

*To all whom it may concern:*

Be it known that I, SIDNEY B. WINN, a citizen of the United States of America, residing at Lapeer, in the county of Lapeer and State of Michigan, have invented certain new and useful Improvements in Tractor Trailers, of which the following is a specification, reference being had therein to the accompanying drawings.

In my companion application filed May 28, 1920 Serial No. 384,947 there is disclosed a tractor-trailer combination wherein a novel fifth wheel construction is employed for supporting the forward end of a trailer relative to the rear end of a tractor or truck, also for universally coupling the two vehicle units together so that the tractor may conveniently move the trailer. The fifth wheel construction includes a circular stationary track carried by the tractor to receive rotatable wheels carried by the trailer.

My invention aims to furnish the rear end of a tractor or truck with rotatable wheels constituting a fifth wheel member to receive and support a trailer fifth wheel member which is in the form of a circular track which seeks its correct position by contact with the wheels of the tractor and bears thereon during the operation of the trailer by the tractor.

My invention further aims to provide a novel ball and socket coupling for a tractor trailer combination, the coupling including a tiltable socket member associated with a draft appliance which establishes a yieldable cushion connection between the trailer and tractor.

This invention also includes an adjustable trailer support operatable from the front end of the trailer, and a brake mechanism for the trailer operatable adjacent the adjustable support of the trailer.

Reference will now be had to the drawings, wherein—

Figure 1 is a side elevation of the tractor trailer combination, partly broken away and partly in section;

Fig. 2 is a plan of a portion of the tractor showing the socket member as associated with a draft appliance;

Fig. 3 is a cross sectional view taken on the line III—III of Fig. 1;

Fig. 4 is an enlarged longitudinal sectional view of the ball and socket coupling device, and Fig. 5 is a detail sectional view of the draft appliance.

In the drawings, the reference numeral 1 denotes a trailer chassis or frame having its rear end supported by a truck 2 provided with a conventional form of band brake mechanism 3 operatable by a forwardly extending rod 4. The forward end of the trailer is adapted to be supported on the rear end of a tractor and, when not so supported, by an adjustable wheeled support 5 pivotally mounted, as at 6 on the bottom of the chassis or frame 1 adjacent the forward end thereof. The wheeled support 5 is adapted to be swung downwardly towards the ground to cooperate with the truck 2 in supporting the trailer chassis so that it may be loaded, unloaded and safely moved about. The wheeled support 5 is pivotally connected by a link 7 to a reciprocable bar 8 slidable in transverse members 9 of the chassis or frame 1, said reciprocable bar having a stop 10 adjacent its rear end to impinge against the rearmost transverse member 9 and limit the downward movement of the wheeled support relative to the chassis or frame. The forward end of the bar 8 is loosely connected, as at 11, to the lower end of an operating lever 12 pivotally connected to an A frame 13 mounted on the forward end of the trailer chassis or frame 1. The A frame 13 provides a rack 14 for a conventional form of locking device 15 carried by the lever 12, and it is possible to lock the wheeled support 5 in a raised or lowered position.

The pivotal connection between the trailer chassis 1 and the wheeled support 5 supports a depending brake lever 16 at the side of the chassis 1, and said brake lever is connected by a link 17 to a crank 18 pivotally held below the chassis or frame 1. The rod 4 is connected to the crank 18 and by manipulating the brake lever 16, the brake mechanism 3 may be actuated. When the wheeled support 5 is raised, as shown in Fig. 1, the brake mechanism 3 is released so that the trailer may be moved by the tractor, and when the wheeled support is lowered to support the trailer, independent of the tractor, the brake mechanism 3 may be set to prevent accidental movement of the trailer or operated to control the movement of the trailer, for instance when moving the trailer from one location to another for loading or unloading purposes.

Considering the truck or tractor adapted for moving the trailer, the reference numeral 19 denotes a tractor chassis or frame having side bearings 20 for rotatable wheels 21, said wheels being placed in the chassis 19 and in opposed relation without a connecting axle or shaft. These wheels constitute a fifth wheel member for the tractor and adapted to ride on said wheels is a stationary fifth wheel member 22 mounted on the bottom of the chassis or frame 1 at the forward end of the trailer. The stationary fifth wheel member 22 has its edges beveled, as at 23 so that it may readily mount the wheels 21, and said fifth wheel member has a depending annular wall 24 which cooperates with the member 22 in forming a circular track for the wheels 21. The wall 24 constitutes a guiding or deflecting member for properly positioning the forward end of the trailer relative to the rear end of the tractor. For instance, when backing the rear end of the tractor under the forward end of the trailer, the wheels 21 will impinge against the beveled edge of the fifth wheel member 22 and gradually elevate the forward end of the trailer. One or both of said wheels will engage the circular wall 24 and guide or deflect said wall until both of the wheels 21 engage opposite sides of the wall, as best shown in Fig. 3. The forward end of the trailer will then be held for a swivel or fifth wheel movement relative to the tractor, and the wall 24 of the fifth wheel member 22 cooperates with the wheels 21 in preventing lateral displacement in a transverse direction of the forward end of the trailer relative to the rear end of the tractor. The trailer may shift in a longitudinal direction relative to the tractor and such shifting movement is limited by a coupling between the tractor and trailer that will now be described.

On the rear end of the tractor chassis 19 are transverse members 25 and 26 and slidable in these transverse members are parallel draft rods 27 having heads 28 at the front ends thereof and a connecting cross head 29 at the rear end thereof. Encircling the rods 27 are coiled draft springs 30 and 31, the springs 31 being disposed between the transverse member 26 and the cross head 29, and the springs 30 between the transverse member 26 and a follower 32ª on the rods 27 normally against the heads 28 and the transverse member 25. It is now obvious that the set of springs 31 serve as a buffer or cushion for the cross head 29 when pushed towards the transverse member 26 and that the set of springs 30 serve to cushion and retard movement of the cross head 29 away from the transverse member 26. The cross head 29 therefore has a reciprocable movement relative to the transverse support afforded by the members 25 and 26, and the draft appliance associated with said cross head prevents excessive movement thereof.

Centrally of the cross head 29 is a rearwardly extending arm 32 and pivotally connected to said arm by a transverse pin 33 is a tiltable forked socket member which is substantially H shaped in plan, said socket member having curved parallel jaws 34, cam jaws 35 and a connecting body 36. One of the cam jaws 35 is connected by a coiled retractile spring 37 to the rear end of the arm 32 and the retractile force of this spring is adapted to hold the socket member in an open tilted position, as shown by dot and dash lines in Fig. 4. To hold the socket member in a horizontal closed position, the same cam jaw 35 has a notch 38 to receive a spring pressed latch 39 slidable in a housing 40 carried by the front side of the cross head 29. The latch 39 has a rod 41 extending out of the housing 40 and connected by a rod 42 to a pivoted pedal 43 conveniently located at the dash or foot board of the tractor, so that the driver or operator of the tractor may tread upon or push the pedal 43 to retract the latch 39 and release the tiltable socket member, thereby permitting the retractile force of the spring 37 to tilt the same.

Depending from the fifth wheel member 22 of the trailer is a central ball member 44, best shown in Fig. 3, and this ball member is adapted to be held by the tiltable forked socket member to couple the trailer to the tractor without interfering with the fifth wheel construction between said tractor and trailer.

When the tractor is to be backed under the forward end of the trailer, the driver or operator of the tractor releases the tiltable socket member so that it will assume an open position, if not already in such position. As the tractor backs under the trailer, the socket member will eventually encounter the ball member and the rear end of the arm 32. As the backing under of the tractor continues the draft appliance is brought into action and the socket member yields until the connecting body 36 thereof impinges against a stop member 45 mounted on the transverse members 25 and 26. As the connecting body 36 rides under the stop member 45 the forked socket member is forced to a closed position on the ball member 44, as shown in Fig. 4, with the latch 39 snapping into the notch 38 to lock the socket member in a horizontal closed position with the jaws 34 on the ball member 44. Besides the jaws 34 being curved or hook shaped to engage down over the ball member 44, said jaws have a cross sectional shape, as shown in Fig. 3, so as to conform to the periphery of the ball member 44 and thus establish a connection which cooperates with the fifth wheel construction in preventing vertical displacement of the forward end of the trailer relative to the tractor. The ball and socket connection does not interfere with the action of the draft appliance so that there may be a longitudinal yieldable movement of one vehicle unit relative to the other.

When the tractor and trailer are to be uncoupled, the wheeled support 5 is lowered and the brakes set. The driver or operator of the tractor may then retract the latch 34 and permit the socket member to release the ball member. The tractor may then pull away from the trailer and leave the wheeled support 5 supporting the forward end of the trailer.

I attach considerable importance to the fact that the operator of the tractor may back the machine under the trailer, at any angle and always effect a coupling, and this obviates placing the two vehicle units in alinement for coupling, which is impossible on some streets when the trailer is backed up to a curb.

What I claim is:—

1. In a tractor-trailer combination, a tractor, a trailer adapted to be moved by the tractor and independent thereof, a coupling for said tractor and trailer, a wheeled fifth wheel member on said tractor, and a fifth wheel member on said trailer providing a concentric curved wall adapted to be engaged and centered by the fifth wheel member of said tractor, said trailer fifth wheel member providing a circular track formed in part by the curved wall thereof.

2. In a tractor trailer combination, a tractor, a trailer adapted to be moved by the tractor and independent thereof, a coupling for said tractor and trailer, wheels on said tractor, and a circular track on said trailer supporting said trailer on the wheels of said tractor and adapted to extend between the wheels of the tractor fifth wheel formation when in service position, said track being operative to co-operate with the wheels during coupling to place the tractor and trailer in coupling relation.

3. In a tractor trailer combination, a tractor, a trailer adapted to be moved by the tractor and independent thereof, a coupling for said tractor and trailer, opposed wheels on said tractor, a fifth wheel member on said trailer adapted to travel on said wheels, and a depending annular wall carried by said trailer fifth wheel member and extending between said tractor wheels.

4. In a tractor-trailer combination, a tractor, a trailer, and means operative to permit coupling and uncoupling of tractor and trailer, said means including a fixedly-positioned ball member carried by the trailer, an element carried by the tractor and co-operative with the ball member to form a draft appliance and being yieldable in the direction of draft application, said element having a formation movable independently of the yielding movement to engage and disengage the ball member, releasable means for retaining said formation in its ball engaging position, and rigid means on the tractor operative to move the formation to such engaging position, said rigid means being positioned to become active solely when the element has been moved in one of its directions of yield.

5. In a tractor trailer combination, a tractor, a trailer, a fifth wheel member on said trailer, said member including an annular guide formation and a concentrically-positioned element, a wheeled fifth wheel member on said tractor adapted to support the trailer fifth wheel member, and a draft appliance on said tractor adapted to be connected to said element of the trailer fifth wheel member, said appliance and element constituting a coupling between said tractor and trailer and operative to couple in a plurality of angular positions.

6. The combination of a tractor, a trailer adapted to be coupled to said tractor, a ball member carried by said trailer, a socket member tiltable on a substantially horizontal axis and adapted to engage and hold said ball member, a draft appliance supporting said socket member relative to said tractor, means for maintaining said socket member in engagement with said ball member and adapted to be released to permit of said socket member tilting, and means for tilting said socket member.

7. The combination of a tractor, a trailer, and means for coupling said tractor and trailer, said means including a ball member carried by the trailer, a socket member carried by the tractor and tiltable on a substantially horizontal axis between a position to permit free entrance of the ball member into socket-member engaging relation by relative movement of traction and trailer in coupling direction and a ball-retaining position to prevent withdrawal movement of the ball-member under traction service conditions, supporting means for the socket member to permit yielding thereof in a substantially horizontal direction, means rendered active by such yielding movement to shift the socket member into ball-retaining position, releasable means for maintaining the socket member in its ball-retaining position, and means rendered active by the release of such maintaining means to shift the socket member to its opposite position to permit the ball-member to leave the socket-member.

8. In a tractor-trailer combination, a tractor, a trailer, and means operative to permit coupling and separation of the tractor and trailer by relative movement when said tractor and trailer are in either of a plurality of relative angular positions, said means including co-operating fifth wheel formations carried by the tractor and trailer respectively with the tractor formation including a permanently-positioned wheeled structure and with the trailer formation active as a guide for the wheeled structure of the tractor formation during approach of the tractor to such coupling position, and co-operating coupling instrumentalities carried by the tractor and trailer respectively and operative to permit automatic coupling of the tractor and trailer upon completion of the tractor approach movement.

9. In tractor-trailer combinations wherein the tractor and trailer are detachably connectible for combined or separate service, means for producing a cushioned draft relation between the tractor and trailer by movements of one relative to the other, said means including co-operating coupling instrumentalities carried respectively by tractor and trailer and operative to permit automatic coupling operation, said instrumentalities including a normally-open coupling member on the tractor, means carried by the tractor for moving said member to coupling position, said latter means being positioned relative to said member as to limit such means activity to a period when relative movement of tractor and trailer and their coupling instrumentalities has set up cushioning activity in an approach direction, and releasable means rendered active by member movement for retaining the tractor instrumentality in its coupling position.

10. Means for coupling two vehicles of the semi-trailer type by backing one vehicle towards the other said means comprising coupling members, one of which is normally open and yieldable by being engaged by the other coupling member, stationary means in the path of the yieldable and open coupling member and against which said open coupling member impinges to cause said open coupling member to close on the other coupling member, and means for retaining the members in coupled relation, said parts being constructed and arranged to permit freedom of yielding movement to the coupled members when the open coupling member has been shifted to its closed position.

In testimony whereof I affix my signature in the presence of two witnesses.

SIDNEY B. WINN.

Witnesses:
ANNA M. DORR,
KARL H. BUTLER.